(12) United States Patent
Sakishita et al.

(10) Patent No.: US 9,277,107 B2
(45) Date of Patent: Mar. 1, 2016

(54) CAMERA APPARATUS AND MOUNT ADAPTER

(71) Applicant: Sony Corporation, Tokyo (JP)

(72) Inventors: Yoshimasa Sakishita, Kanagawa (JP); Yuki Matsumoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/190,914

(22) Filed: Feb. 26, 2014

(65) Prior Publication Data

US 2014/0300796 A1    Oct. 9, 2014

(30) Foreign Application Priority Data

Apr. 4, 2013    (JP) .................................. 2013-078317

(51) Int. Cl.
   *H04N 5/225*    (2006.01)
(52) U.S. Cl.
   CPC ........... *H04N 5/2254* (2013.01); *H04N 5/2252* (2013.01)
(58) Field of Classification Search
   CPC ........ G03B 17/14; G03B 17/12; G06K 9/209; H04N 5/2254; G02B 7/14
   See application file for complete search history.

(56) References Cited

U.S. PATENT DOCUMENTS

| | | | |
|---|---|---|---|
| 7,372,642 B2* | 5/2008 | Rohaly et al. | 359/740 |
| 8,462,263 B2* | 6/2013 | Yano | 348/374 |
| 8,675,290 B2* | 3/2014 | Rohaly et al. | 359/740 |
| 8,675,291 B2* | 3/2014 | Rohaly et al. | 359/740 |
| 8,687,113 B2* | 4/2014 | Yano et al. | 348/375 |
| 2007/0188601 A1* | 8/2007 | Rohaly et al. | 348/47 |
| 2007/0295893 A1* | 12/2007 | Olsen et al. | 250/226 |
| 2008/0239142 A1* | 10/2008 | Suzuki | 348/376 |
| 2009/0302205 A9* | 12/2009 | Olsen et al. | 250/226 |
| 2010/0111489 A1* | 5/2010 | Presler | 386/52 |
| 2011/0102669 A1* | 5/2011 | Yano | 348/376 |
| 2012/0162503 A1* | 6/2012 | Yano et al. | 348/376 |
| 2014/0049688 A1* | 2/2014 | Ohnishi et al. | 348/375 |
| 2014/0341556 A1* | 11/2014 | Kestermann | 396/419 |

FOREIGN PATENT DOCUMENTS

JP    2007-335990 A    12/2007

OTHER PUBLICATIONS

B&H webpage for MTF Services Ltd B4 2/3" to Sony F3 Lens Adapter Package, Mar. 15, 2013, retrieved from archive.org on Apr. 6, 2015.*

\* cited by examiner

*Primary Examiner* — Nicholas Giles
(74) *Attorney, Agent, or Firm* — Michael Best & Friedrich LLP

(57) ABSTRACT

A camera apparatus includes: a camera main body having a single plate type imaging section; and a handle mounting section for mounting a handle on an upper portion of the camera main body, wherein a lens for a three-plate type imaging section can be mounted on a lens mount section of a front portion of the camera main body via a mount adapter, and the handle mounting section mounts the handle on the upper portion of the camera main body so as to be able to move in a front-back direction.

8 Claims, 15 Drawing Sheets

CAMERA APPARATUS AND MOUNT ADAPTER

CROSS REFERENCE TO RELATED APPLICATIONS

This application claims the benefit of Japanese Priority Patent Application JP 2013-078317 filed Apr. 4, 2013, the entire contents of which are incorporated herein by reference.

BACKGROUND

The present disclosure relates to a camera apparatus and a mount adapter and specifically, to a camera apparatus or the like which is provided with a handle.

In the past, as a camera apparatus, portable camera apparatuses which are provided with a handle had been known. In this case, designing with the shape accommodation of a fixed handle in which a grip position of the handle or a viewfinder (VF) mounting position is optimized in accordance with the center of gravity of each camera apparatus or the type of a lens mount were widely done.

However, in a case of adopting the fixed handle in the aforementioned manner, it is difficult to cope with changes in the center of gravity or the optimal mounting position of the viewfinder which is caused due to a difference in the type or the position of peripheral equipment which is mounted on a camera.

Therefore, in the past, providing a large-sized handle or a detachable separate handle was proposed. However, the large-sized handle becomes an obstacle when not being used. Further, in the separate handle, it takes time to mount and dismount the separate handle and a response to a minute difference in the center of gravity or the viewfinder mounting position is becomes slow.

Further, in the past, as described in Japanese Unexamined Patent Application Publication No. 2007-335990, for example, or the like, movably mounting a handle on a camera was also proposed. In this case, it became possible to avoid inconvenience when fixing a handle.

SUMMARY

It is desirable to attain improvement in the usage environment of a lens for a three-plate type imaging section in a camera main body having a single plate type imaging section.

According to an embodiment of the present disclosure, there is provided a camera apparatus including: a camera main body having a single plate type imaging section; and a handle mounting section for mounting a handle on an upper portion of the camera main body, in which a lens for a three-plate type imaging section can be mounted on a lens mount section of a front portion of the camera main body via a mount adapter, and the handle mounting section mounts the handle on the upper portion of the camera main body so as to be able to move in a front-back direction.

In the embodiment of the present disclosure, the camera main body has a single plate type imaging section. The single plate type imaging section is an imaging section configured by using a sheet of image sensor equipped with a color filter. A lens for a three-plate type imaging section can be mounted on the lens mount section of the front portion of the camera main body via the mount adapter. The three-plate type imaging section is an imaging section configured by using a dedicated image sensor for each of the three primary colors.

The handle is mounted on the upper portion of the camera main body by the handle mounting section. In this case, the handle is mounted as to be able to move in the front-back direction. For example, the handle mounting section may have a lock mechanism which fixes a position in the front-back direction of the handle to an arbitrary position. Further, for example, the handle may have a viewfinder mounting section for mounting a viewfinder.

In this manner, in the embodiment of the present disclosure, the camera main body has a single plate type imaging section. However, a lens for a three-plate type imaging section can be used to be mounted on the lens mount section of the front portion of the camera main body via the mount adapter. Further, the handle is mounted on the camera main body so as to be able to move in the front-back direction, and examining a case of mounting the lens for a three-plate type imaging section, the position of the handle can be moved in accordance with a change in the center of gravity. Therefore, it becomes possible to attain improvement in the usage environment of the lens for a three-plate type imaging section in the camera main body having a single plate type imaging section.

In addition, in the embodiment of the present disclosure, for example, the camera apparatus may further include a shoulder adapter mounting section for mounting a shoulder adapter on a lower portion of the camera main body, wherein the shoulder adapter mounting section mounts the shoulder adapter on the lower portion of the camera main body so as to be able to move in the front-back direction. In this case, examining a case of mounting the lens for a three-plate type imaging section, it becomes possible to adjust the position of the shoulder adapter to the optimal position in accordance with a change in the center of gravity, a change in the position of the viewfinder, or the like.

Further, in the embodiment of the present disclosure, for example, the camera apparatus may further include a support mechanism which supports the mount adapter by using a rod-like portion provided on the shoulder adapter so as to protrude in a front direction. In this case, in a structure in which the lens for a three-plate type imaging section is mounted on the camera main body via the mount adapter, the lens is supported by not only the mount adapter, but also the support mechanism, whereby it becomes possible to prevent the fatigue, breakage, or the like of the mount adapter before it happens.

Further, in the embodiment of the present disclosure, for example, the mount adapter may have a lens unit which leads a light beam that is incident from the lens for a three-plate type imaging section to the single plate type imaging section of the camera main body, and a filter disk unit having a predetermined type of filter for adjusting a light quantity of the light beam. In this case, the lens unit has functions to adjust a focal length so as to be focused on the image sensor of the single plate type imaging section, to adjust the size of an image which is formed on the image sensor, and the like. Since the mount adapter has the filter disk unit, it becomes possible to perform light quantity adjustment in the mount adapter.

Further, according to another embodiment of the present disclosure, there is provided a mount adapter including: a first mount section which is connected to a lens mount section of a front portion of a camera main body having a single plate type imaging section; a second mount section for connecting a lens for a three-plate type imaging section; and a lens unit which emits a light beam that is incident on the second mount section, from the first mount section.

In the embodiment of the present disclosure, the mount adapter is configured to include the first mount section which is connected to the lens mount section of the front portion of the camera main body having a single plate type imaging section. The single plate type imaging section is an imaging section configured by using a sheet of image sensor equipped with a color filter. Further, in the embodiment of the present disclosure, the mount adapter is configured to include the second mount section for connecting a lens for a three-plate type imaging section. For example, the first mount section may be an FZ mount and the second mount section may be a B4 mount.

Then, a light beam that is incident on the second mount section is emitted from the first mount section by the lens unit. In this case, the lens unit has functions to adjust a focal length so as to be focused on the image sensor of the single plate type imaging section, to adjust the size of an image which is formed on the image sensor, and the like.

In this manner, in the embodiment of the present disclosure, the mount adapter is provided with the first mount section and the second mount section and has a configuration in which the first mount section and the second mount section are optically connected by the lens unit, and it becomes possible to use a lens for a three-plate type imaging section with it mounted on the camera main body having a single plate type imaging section.

In addition, in the embodiment of the present disclosure, for example, the mount adapter may further include a filter disk unit having a predetermined type of filter for adjusting a light quantity of a light beam incident on the second mount section. In this manner, the filter disk unit is provided, whereby it becomes possible to perform light quantity adjustment.

According to the embodiment of the present disclosure, it is possible to attain improvement in the usage environment of a lens for a three-plate type imaging section in a camera main body having a single plate type imaging section. In addition, advantages described in this specification are only illustrative and are not limited and additional advantages may be present.

DETAILED DESCRIPTION OF EMBODIMENTS

Figure 1:
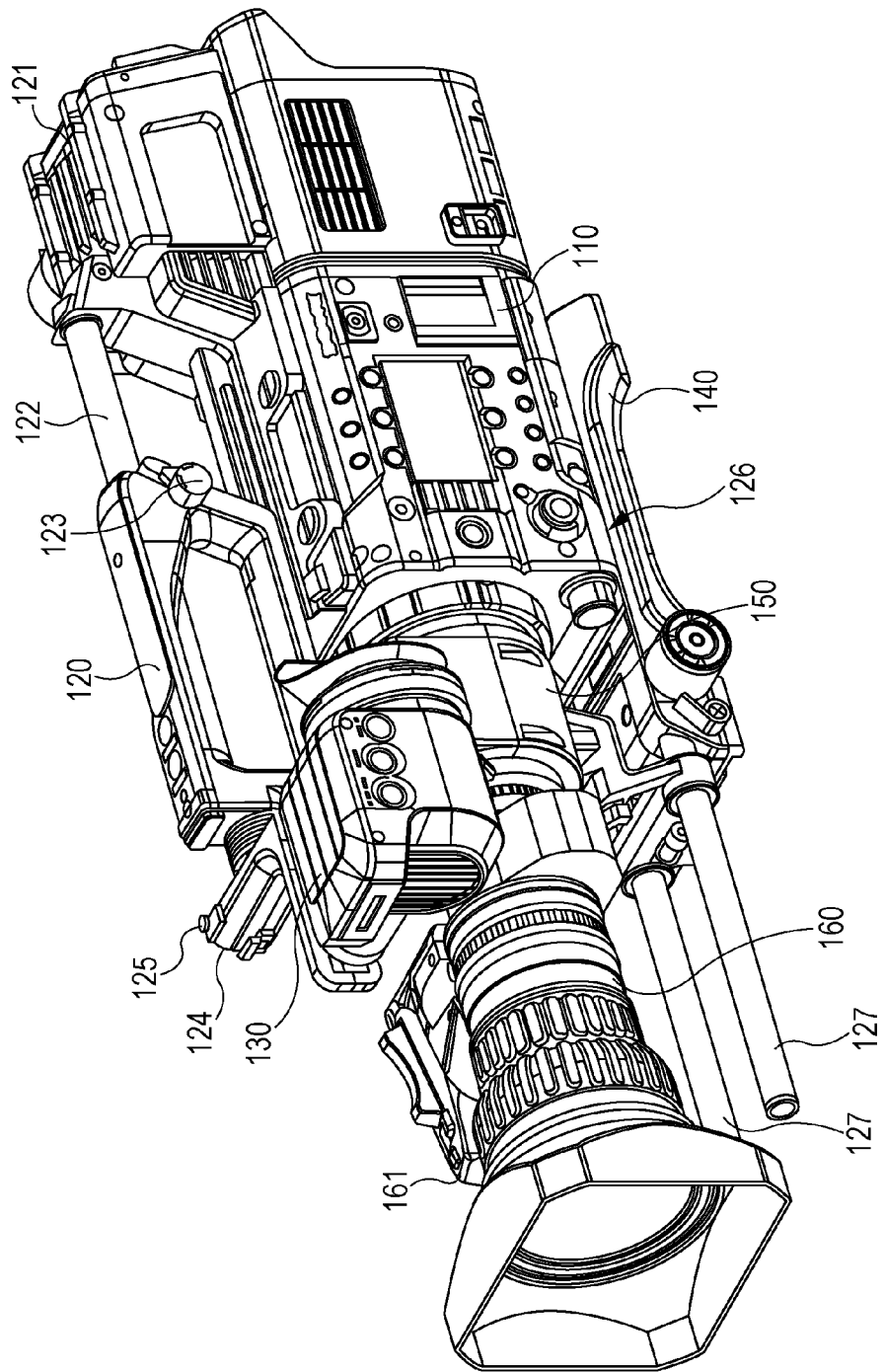
FIG. 1 is a perspective view when a camera apparatus as an embodiment is viewed from a front and obliquely upper direction.

Hereinafter, a mode for carrying out the present disclosure (hereinafter referred to as an "embodiment") will be described. In addition, description will be made in the following order.

1. Embodiment
2. Modified Example

1. Embodiment

Configuration Example of Camera Apparatus

FIGS. 1 to 7 illustrate a configuration example of a camera apparatus 10 as an embodiment. The camera apparatus 10 has a camera main body 110, a handle 120, a viewfinder 130, a shoulder adapter 140, a mount adapter 150, and a lens 160.

Figure 2:
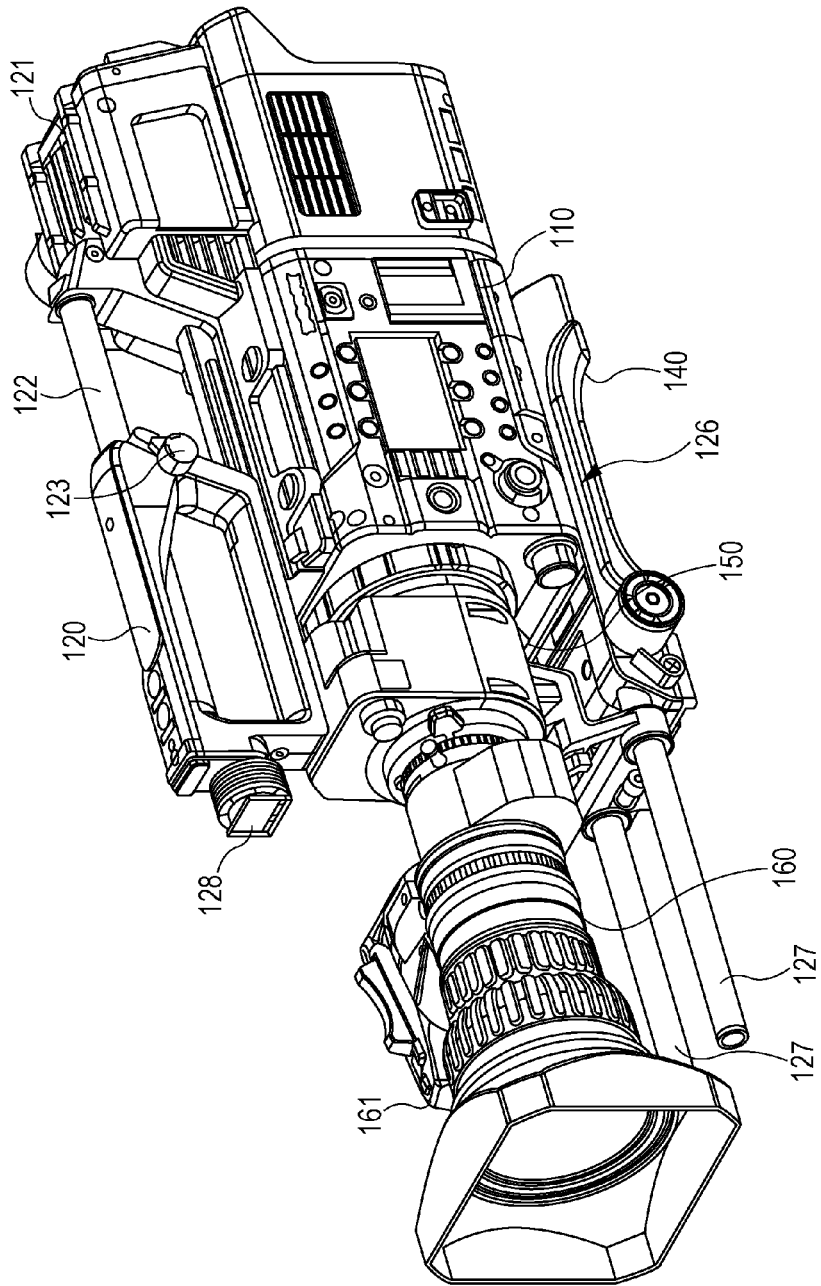
FIG. 2 is a perspective view when the camera apparatus as the embodiment is viewed from a front and obliquely upper direction (in a state where a viewfinder is removed)
Figure 3:
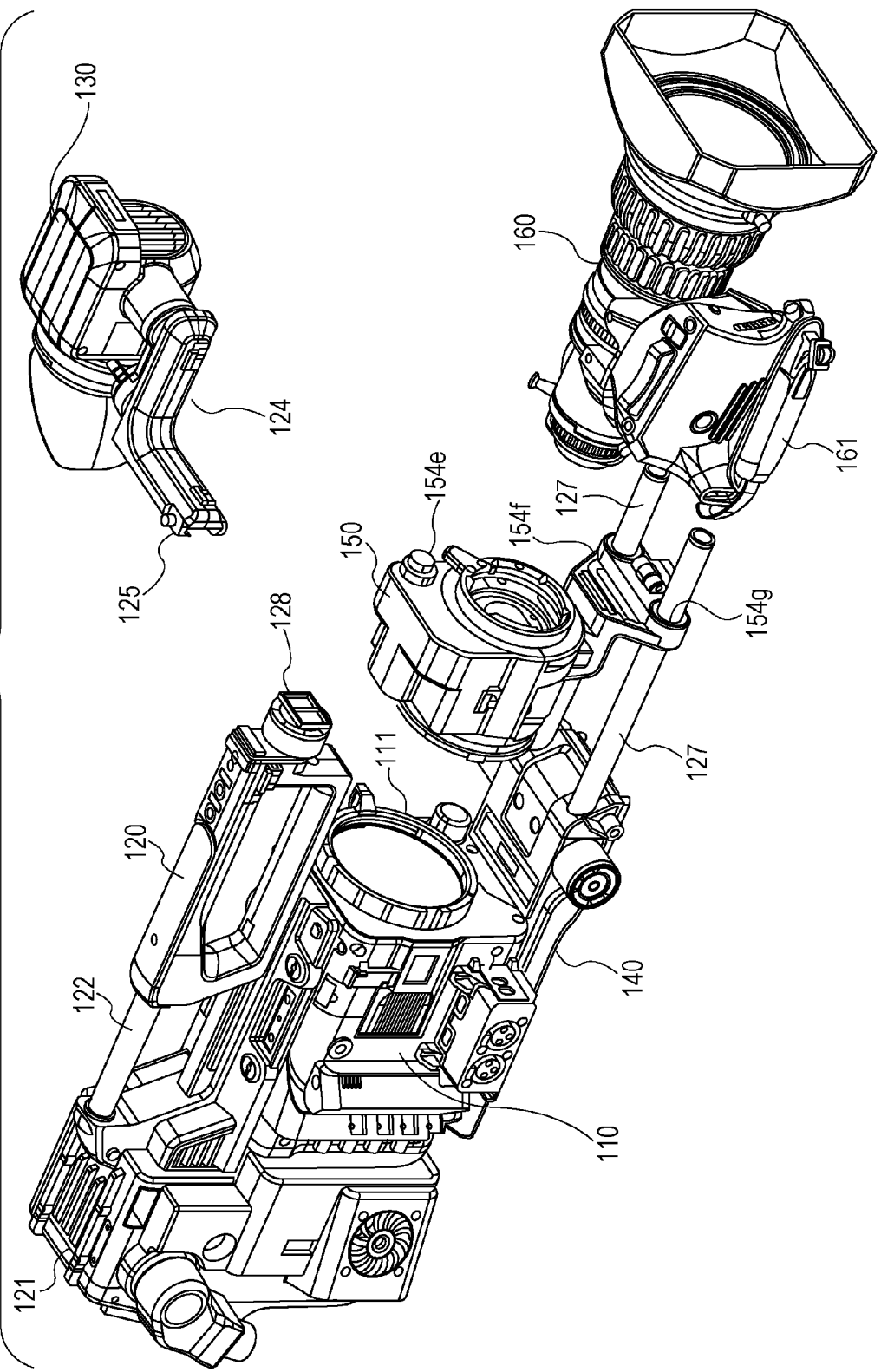
FIG. 3 is an exploded perspective view when the camera apparatus as the embodiment is viewed from a front and obliquely upper direction.
Figure 4:
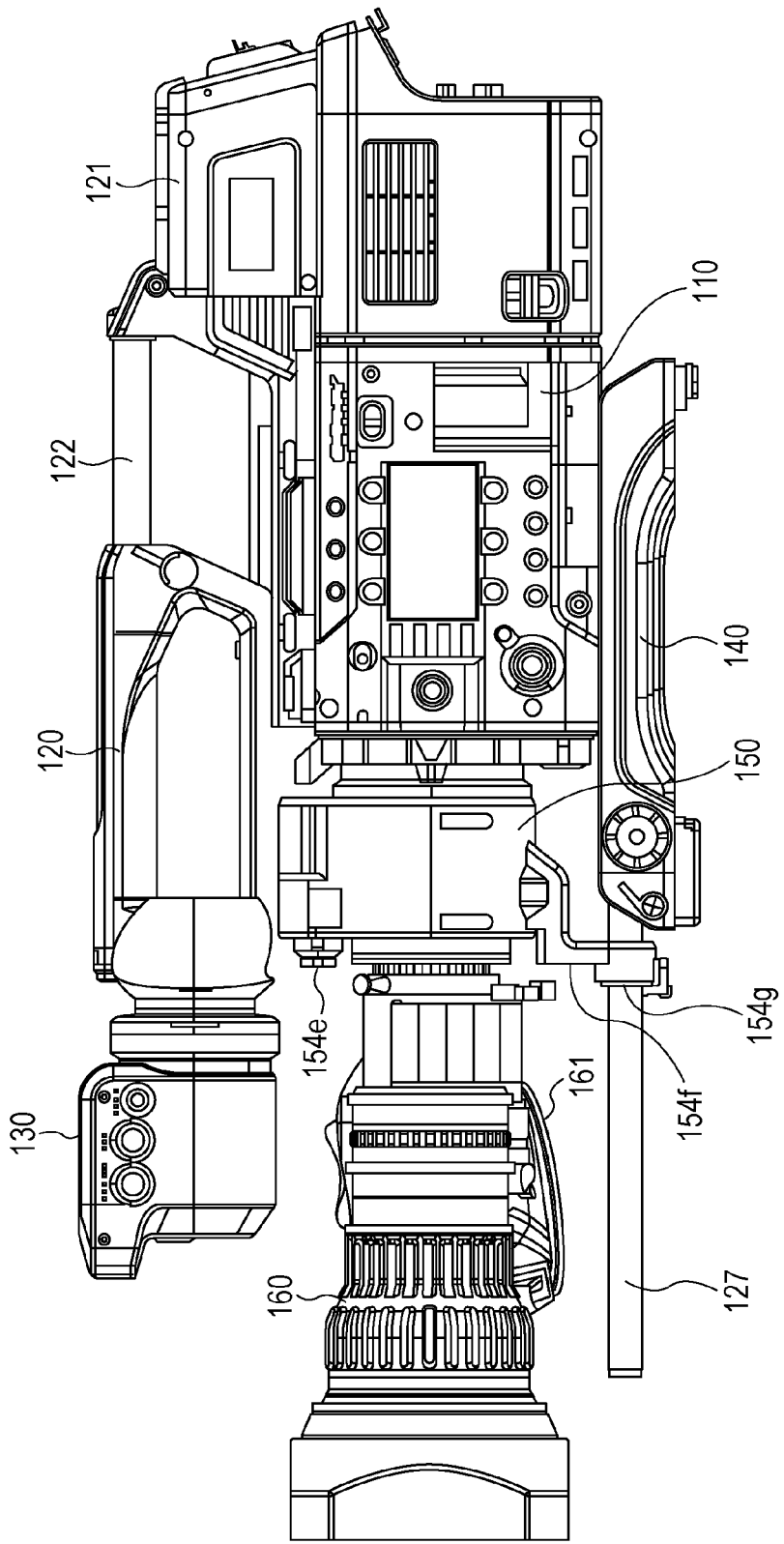
FIG. 4 is a left side view of the camera apparatus as the embodiment.
Figure 5:
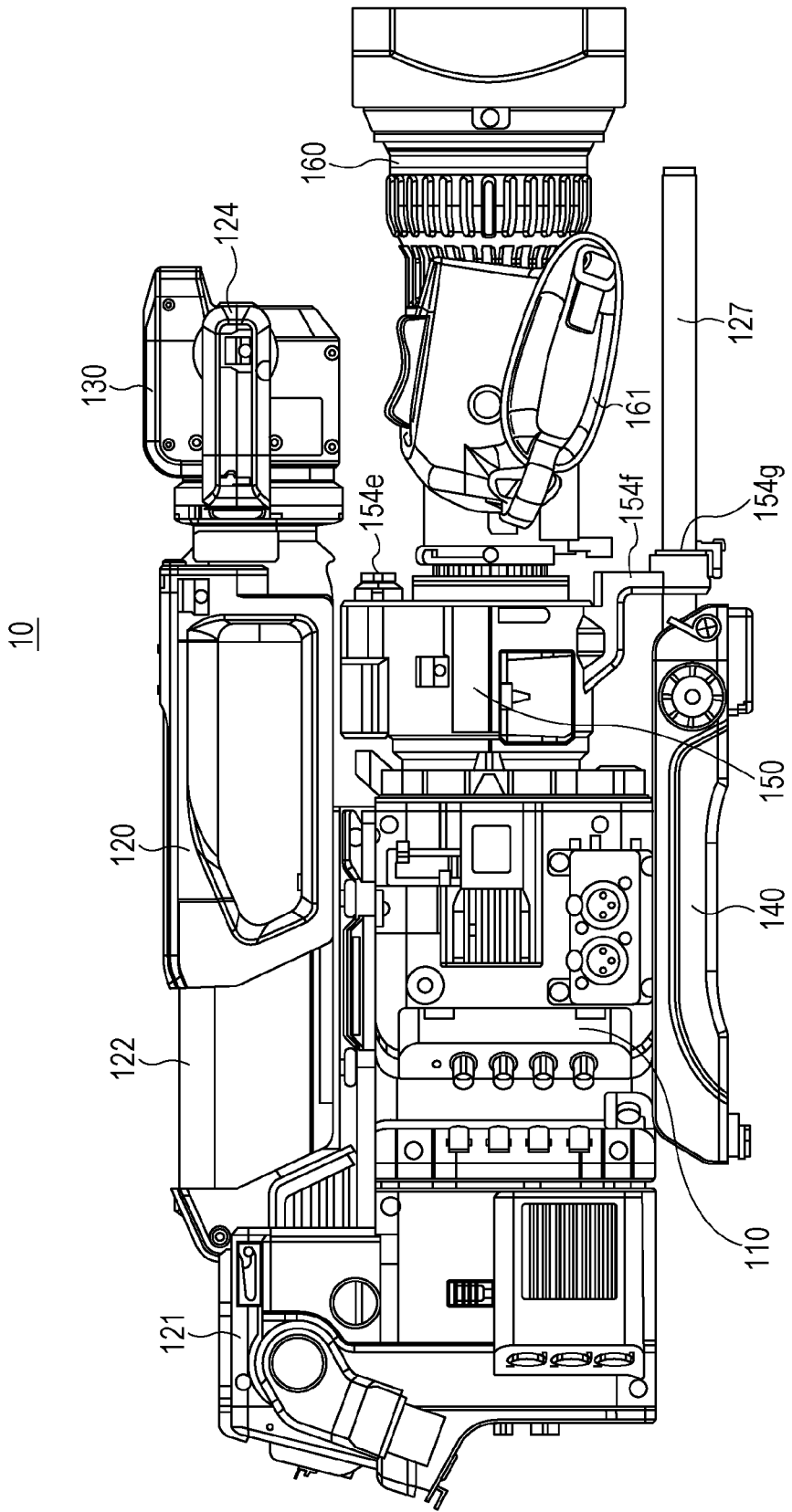
FIG. 5 is a right side view of the camera apparatus as the embodiment.
Figure 6:
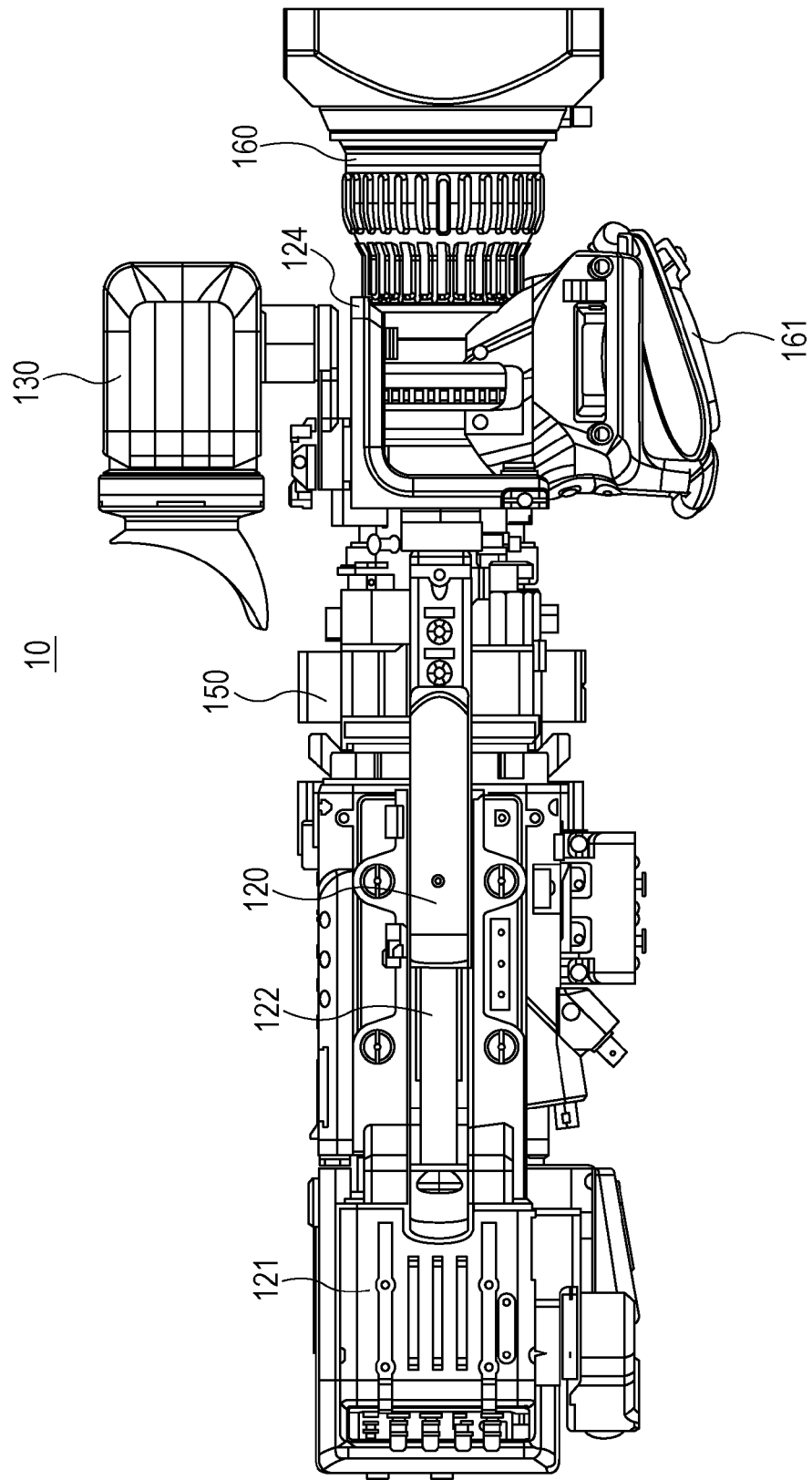
FIG. 6 is a top view of the camera apparatus as the embodiment.
Figure 7:
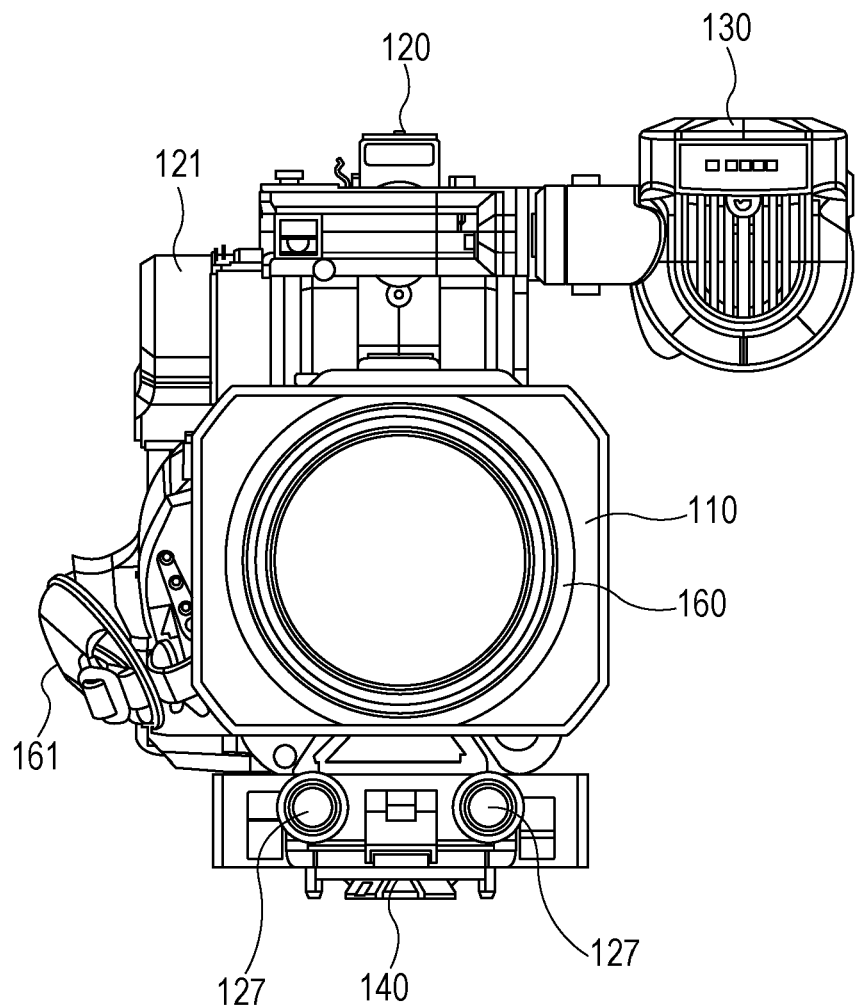
FIG. 7 is a front view of the camera apparatus as the embodiment.

FIG. 1 is a perspective view when the camera apparatus 10 is viewed from a front and obliquely upper direction. FIG. 2 is also a perspective view when the camera apparatus 10 is viewed from a front and obliquely upper direction. However, this drawing illustrates a state where the viewfinder 130 is removed. FIG. 3 is an exploded perspective view when the camera apparatus 10 is viewed from a front and obliquely upper direction. FIG. 4 is a left side view of the camera apparatus 10. FIG. 5 is a right side view of the camera apparatus 10. FIG. 6 is a top view of the camera apparatus 10. FIG. 7 is a front view of the camera apparatus 10.

The camera main body 110 has a single plate type imaging section. Although an illustration is omitted, the single plate type imaging section is an imaging section configured by using a sheet of image sensor equipped with a color filter. For example, as the image sensor, a 35 mm-sized image sensor is disposed. In this manner, the size of the image sensor is set to be 35 mm, whereby the same depth of field as in a case of using a 35 mm film can be obtained. For this reason, it becomes possible for a user to perform photographing in the same sense as in a case of using a 35 mm film.

The handle 120 is mounted on an upper portion of the camera main body 110 for user convenience in transporting the camera apparatus 10. The handle 120 is mounted on the upper portion of the camera main body 110 so as to be able to move in the front-back direction (the optical axis direction), by a handle mounting section 121 fixed to the camera main body 110.

A rod-like member 122 extending forward in the upper portion of the camera main body 110 is provided at the handle mounting section 121. The rod-like member 122 is inserted into a hole portion provided so as to extend in the front-back direction in an upper portion of the handle 120, whereby the handle 120 is mounted so as to be able to move in the front-back direction with respect to the camera main body 110.

The handle 120 can be fixed to an arbitrary position or set to be in a movable state by operating a handle slide lock lever 123 provided on the side face of the handle 120. The illustrated position of the handle slide lock lever 123 shows a state of fixing the position of the handle 120.

The position fixed state of the handle 120 is released by turning the position of the handle slide lock lever 123 in a counterclockwise direction from the position illustrated in FIG. 1, and thus the handle 120 becomes movable in the front-back direction along the rod-like member 122. In this way, a user can move and adjust the handle 120 to an appropriate position depending on the position of the center of gravity or the like of the camera apparatus 10 and fix the handle 120 to the position. The handle slide lock lever 123 configures a locking mechanism.

A viewfinder mounting section 128 is provided at a front portion of the handle 120. One side of an L-shaped member 124 is mounted on the viewfinder mounting section 128 so as to be able to move in a direction orthogonal to a moving direction of the handle 120 (the optical axis direction). Then, the viewfinder 130 is mounted on the other side of the L-shaped member 124. That is, the viewfinder 130 is mounted on the handle 120 via the L-shaped member 124.

A user can adjust an eyecup position of the viewfinder 130 to the optimal position for the user by moving the L-shaped member 124 with the viewfinder 130 mounted thereon, in a direction orthogonal to the moving direction of the handle 120. A user can fix the L-shaped member 124 to an adjusted position thereof by operating a fastening section 125 provided on one side of the L-shaped member 124.

The lens 160 is a lens for a three-plate type imaging section. Here, the three-plate type imaging section is an imaging section configured by using a dedicated image sensor for each of the three primary colors. For example, the size of each image sensor is ⅔ inches. The lens 160 is originally used to be directly connected to a lens mount section of a front portion of a camera main body having a three-plate type imaging section. The mount adapter 150 is used to mount the lens 160 on a lens mount section 111 of the front portion of the camera main body 110 having a single plate type imaging section. That is, the lens 160 is mounted on the camera main body 110 via the mount adapter 150.

A grip section 161 having various operators such as a switch is mounted on the lens 160. A user can fix the right hand to the lens position by the grip section 161 and perform focus adjustment, diaphragm adjustment, zoom adjustment, or the like by an operation of the switch or the like.

The mount adapter 150 has a function to connect the lens 160 to the camera main body 110. In addition, in a case of using the lens 160 for a three-plate type imaging section, the mount adapter 150 has functions to adjust a focal length so as to be focused on the image sensor of the single plate type imaging section, to adjust the size of an image which is formed on the image sensor, and the like.

Figure 8:
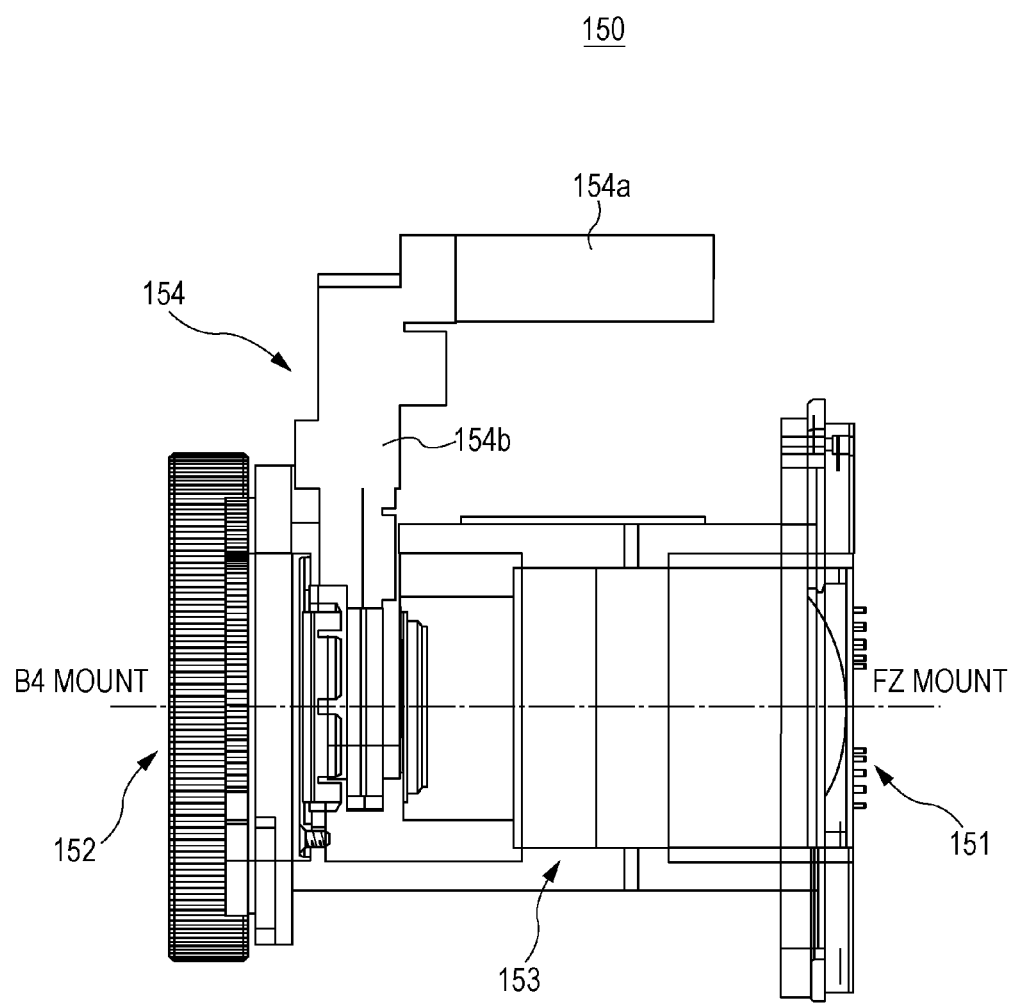
FIG. 8 is a diagram schematically illustrating the configuration of a mount adapter (in a state where a casing is removed)

FIG. 8 is a diagram schematically illustrating the configuration of the mount adapter 150 (in a state where a casing is removed). The mount adapter 150 has, at one end in the optical axis direction, a mount section (a first mount section) 151 which is connected to the lens mount section 111 of the front portion of the camera main body 110. For example, the mount section 151 is regarded as an FZ mount. Further, the mount adapter 150 has, at the other end in the optical axis direction, a mount section (a second mount section) 152 for connecting the lens 160 thereto. For example, the mount section 152 is regarded as a B4 mount.

Further, in the mount adapter 150, a lens unit 153 and a filter disk unit 154 are disposed in series in the optical axis direction. The lens unit 153 emits a light beam incident on the mount section 152, from the mount section 151. The lens unit 153 has functions to adjust a focal length to the image sensor of the single plate type imaging section, to adjust the size of an image which is formed on the image sensor, and the like, as described above.

The filter disk unit 154 is configured so as to be able to adjust the light quantity of a light beam which is incident on the mount section 152. The filter disk unit 154 is configured to include a servomotor 154*a* and a turret rotation mechanism 154*b*. A disk in the turret rotation mechanism 154*b* is rotationally driven by the servomotor 154*a*, whereby a change of a filter which is located on the optical axis in front of the lens unit 153 becomes possible.

Figure 9:
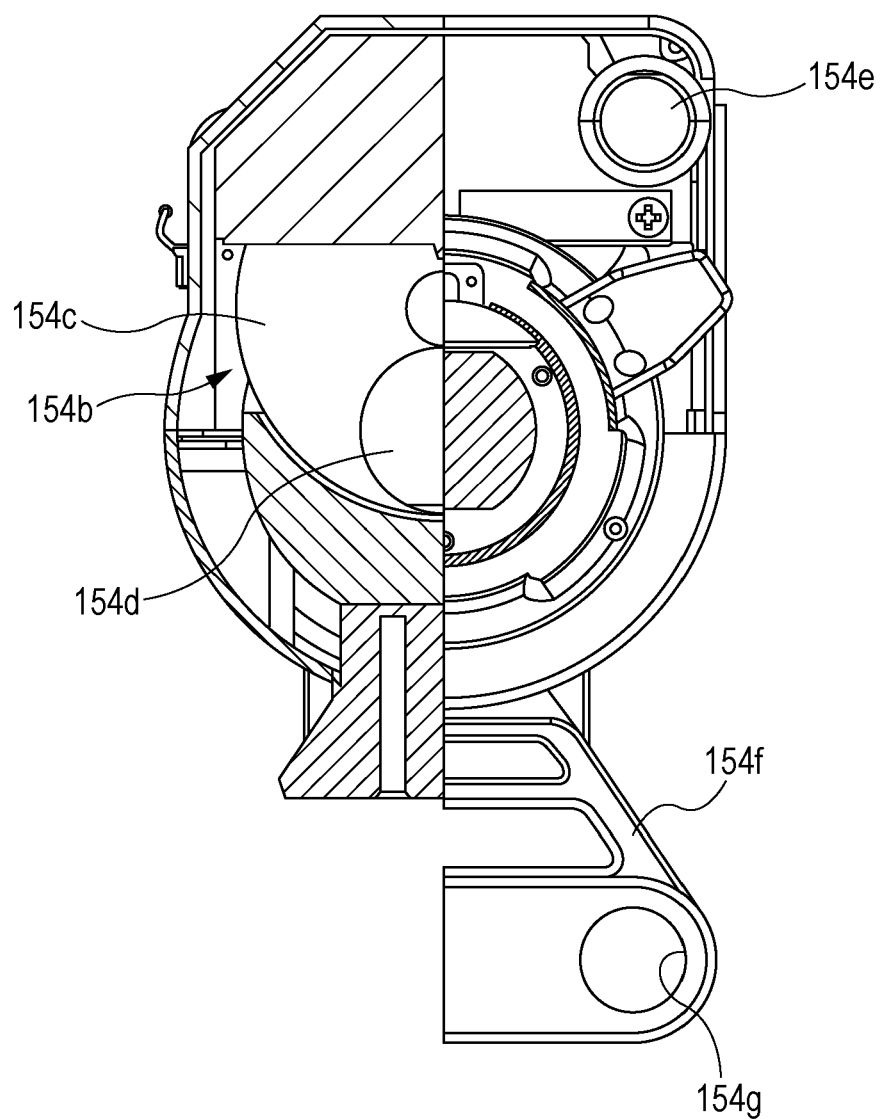
FIG. 9 is a diagram when a filter disk unit is viewed from a front direction and a diagram illustrating the left half in a state of being cut in a direction orthogonal to an optical axis direction.

FIG. 9 is a diagram when the filter disk unit 154 is viewed from a front direction and illustrates the left half in a state of being cut in a direction orthogonal to the optical axis direction. A predetermined number of filters 154*d* (in the drawing, only one is illustrated) are mounted in a circumferential direction of a disk 154*c* configuring the turret rotation mechanism 154*b*. A user presses a push button 154*e*, whereby the disk 154*c* is rotationally driven by the servomotor 154*a* and thus the filter 154*d* which is located on the optical axis is changed.

Figure 10:
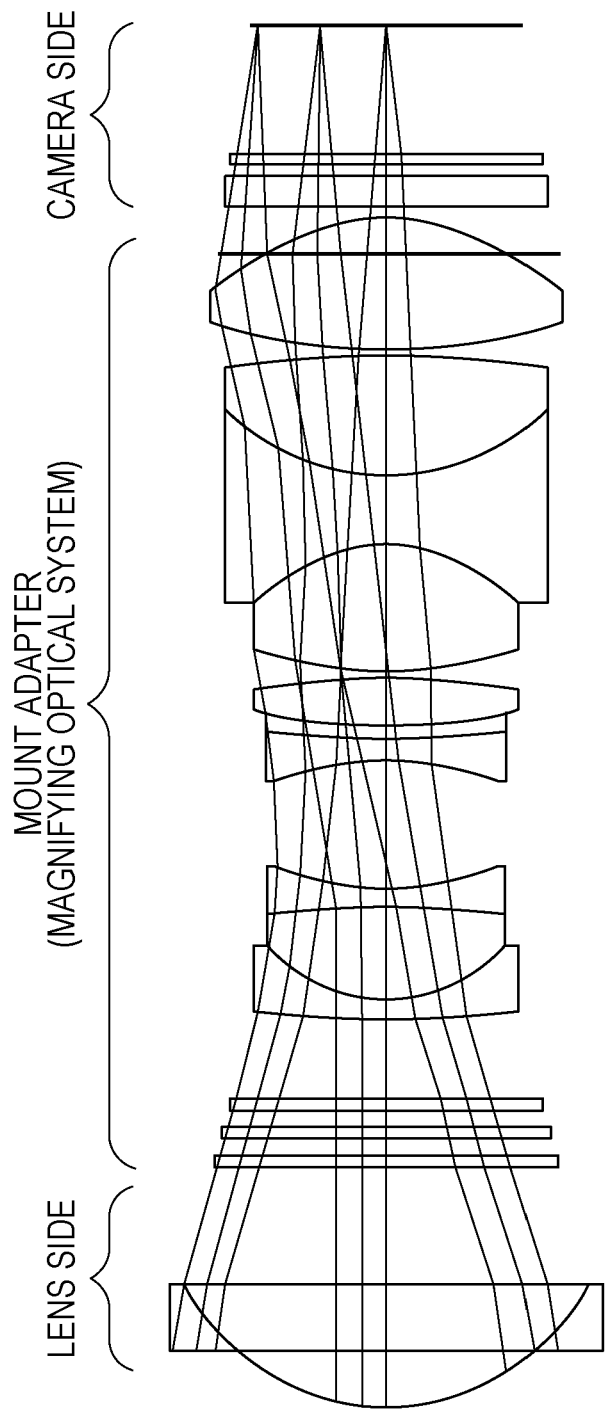
FIG. 10 is a diagram schematically illustrating the lens side, the camera side, and an optical system of the mount adapter which is inserted between the lens side and the camera side.

FIG. 10 schematically illustrates the lens side, the camera side, and an optical system of the mount adapter 150 which is inserted between the lens side and the camera side. As illustrated in the drawing, the optical system of the mount adapter 150 is regarded as a magnifying optical system. As an optical design in this case, a basic configuration in which a front lens group includes concave lenses and a rear lens group includes convex lenses is adopted, the entire length is made long, and the number of constituent lenses is made large, whereby resolution is increased while corresponding to a bright lens.

The shoulder adapter 140 is mounted on a lower portion of the camera main body 110 so as to be able to move in the front-back direction (the optical axis direction), by a shoulder adapter mounting section 126 integrally fixed to the lower portion of the camera main body 110. A user can move and adjust the position of the shoulder adapter 140 to the optimal position for the user depending on a change in the position of the viewfinder 130 by the movement and adjustment of the handle 120 described above.

Two rod-like members (poles) 127 extending in the front direction can be mounted on a front portion of the shoulder adapter 140, as illustrated in the drawing. The rod-like members 127 can be used to mount an attachment for performing, for example, focus adjustment, diaphragm adjustment, and the like. In this embodiment, the rod-like members 127 are used to support the mount adapter 150 described above.

That is, a support section 154*f* is connected to a lower portion of a casing of the mount adapter 150. The support section 154*f* is made into a shape which spreads as it goes to a lower portion, and two opening portions 154*g* are perforated on the lower end side. The two rod-like members 127 described above are inserted into the two opening portions 154*g*. Due to such a configuration, the mount adapter 150 is supported by the two rod-like members 127 provided at the shoulder adapter 140. Here, the support section 154*f* configures a support mechanism. In addition, it is not particularly necessary for the support section 154*f* to be integrated with the casing of the mount adapter 150 and it is also possible to configure the support section 154*f* as a separate body.

In addition, FIGS. 11 to 15 illustrate a configuration example of a camera apparatus 20 as a comparative example with respect to the camera apparatus 10 described above. In these drawings, a portion corresponding to that in FIGS. 1 to 7 described above is denoted by the same reference numeral and the detailed description thereof is omitted. The camera apparatus 20 has the camera main body 110, the handle 120, the viewfinder 130, the shoulder adapter 140, and a lens 180.

Figure 11:
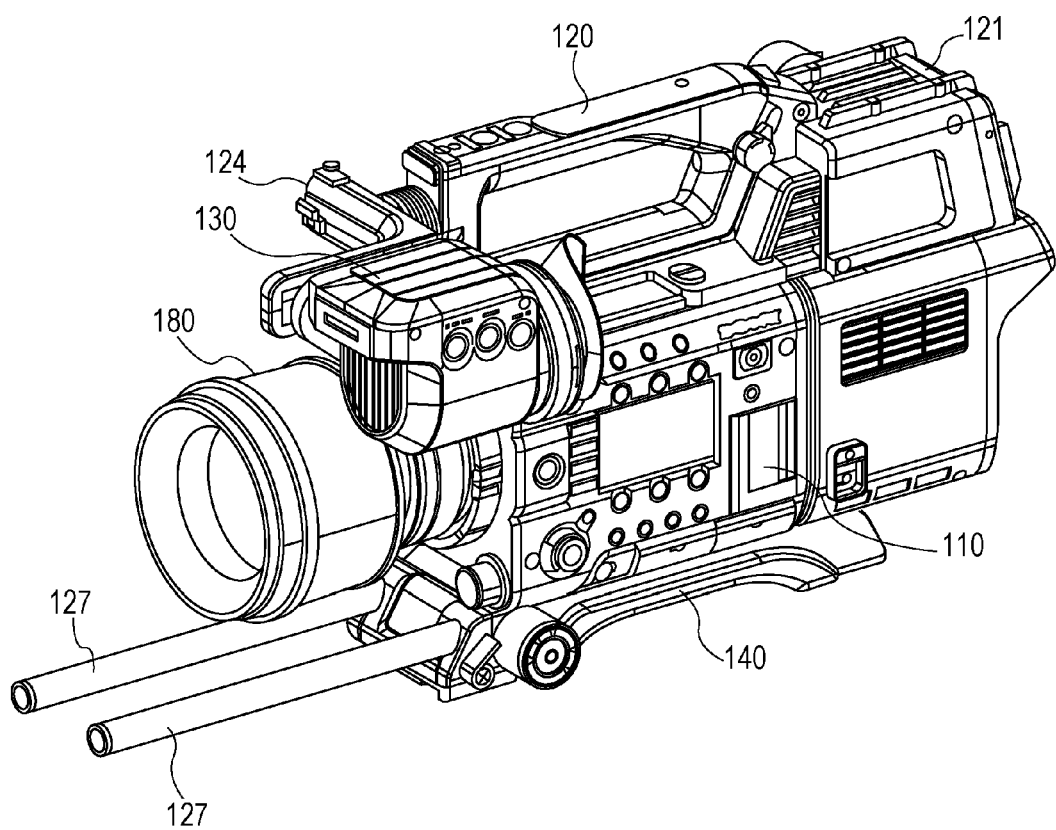
FIG. 11 is a perspective view when a camera apparatus as a comparative example is viewed from a front and obliquely upper direction.
Figure 12:
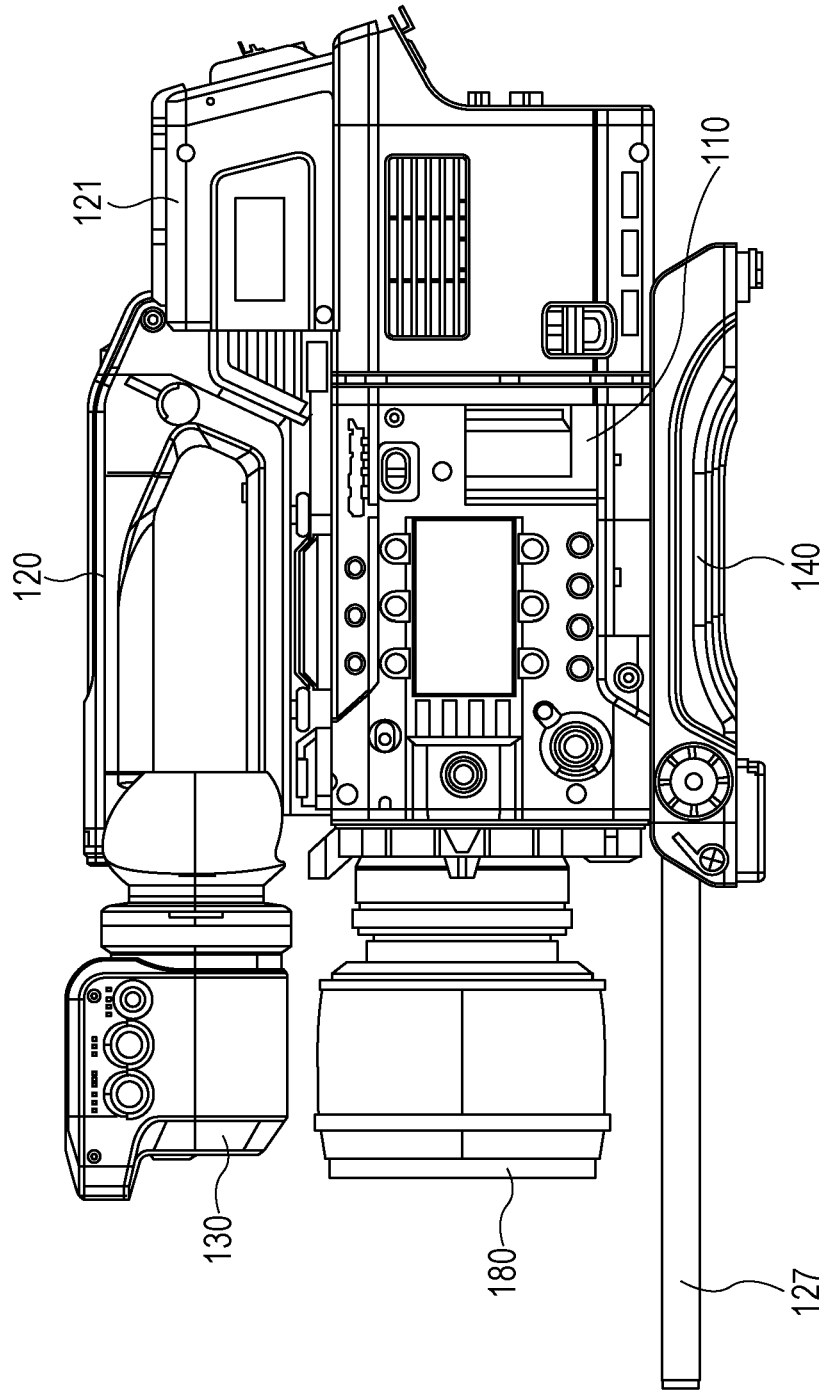
FIG. 12 is a left side view of the camera apparatus as the comparative example.
Figure 13:
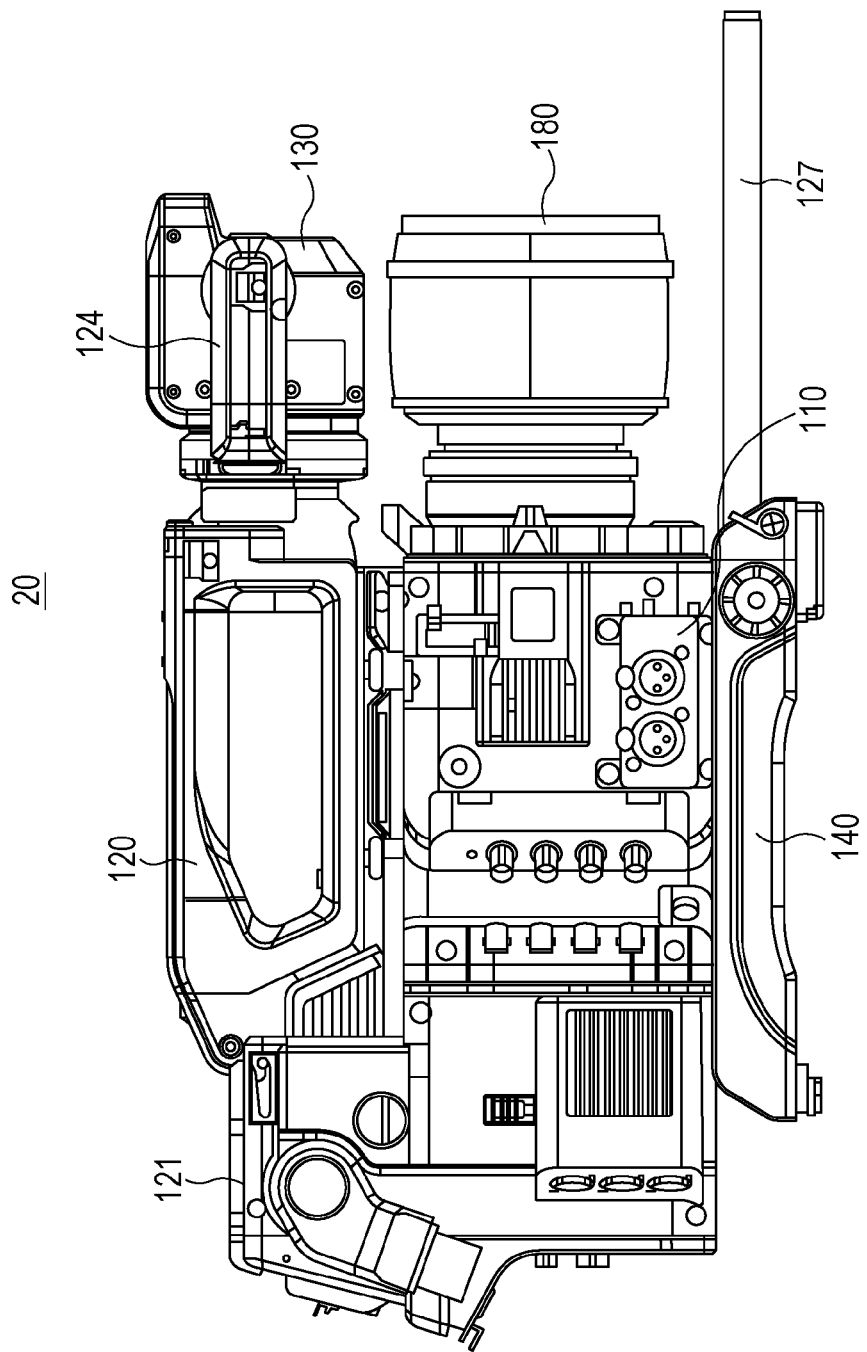
FIG. 13 is a right side view of the camera apparatus as the comparative example.
Figure 14:
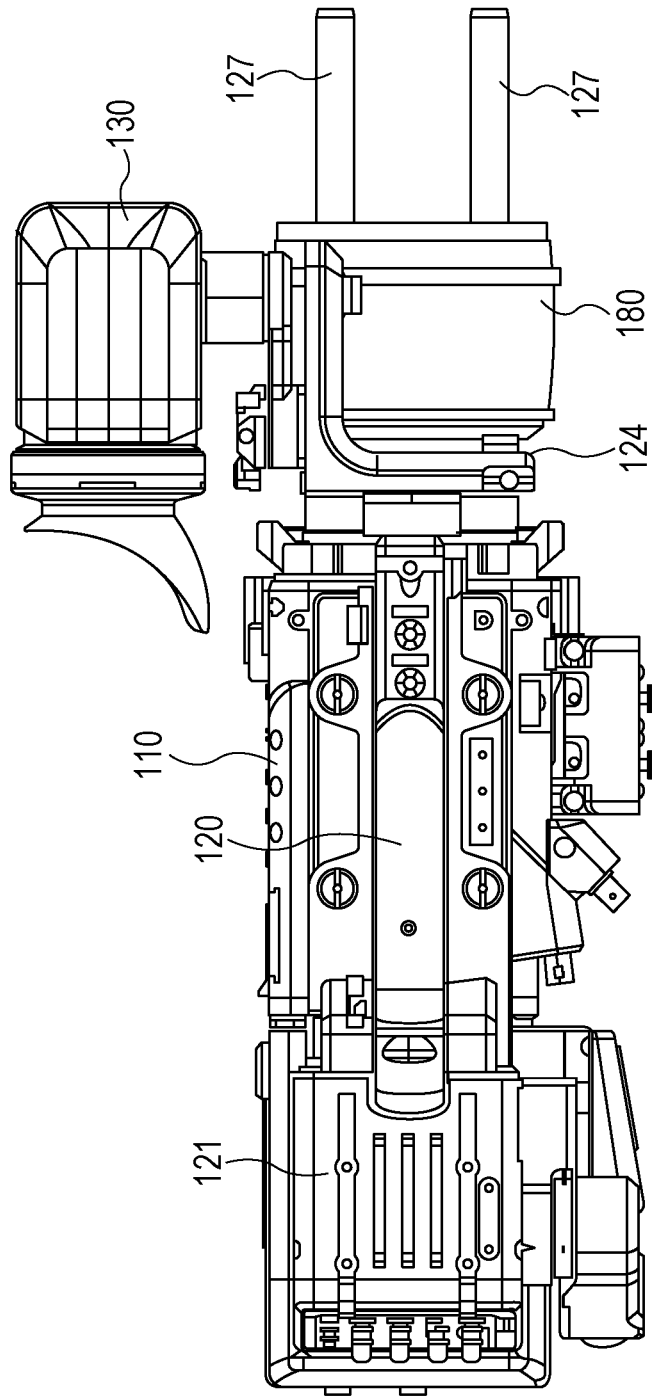
FIG. 14 is a top view of the camera apparatus as the comparative example.
Figure 15:
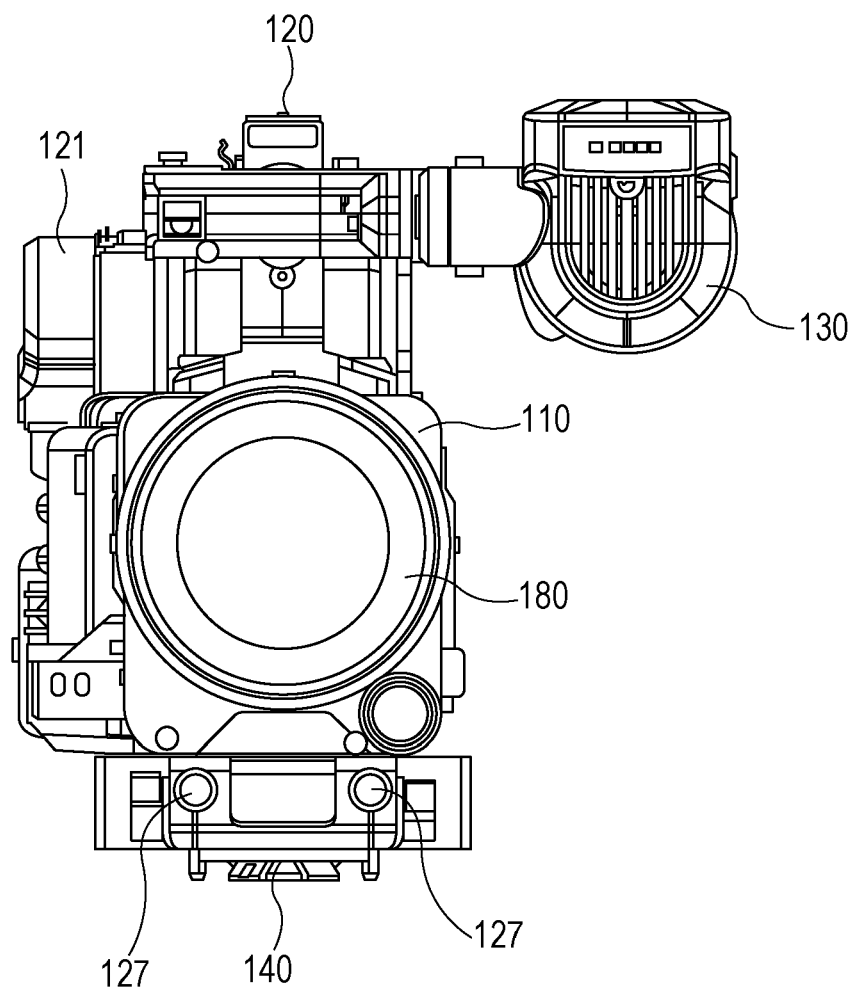
FIG. 15 is a front view of the camera apparatus as the comparative example.

FIG. 11 is a perspective view when the camera apparatus 20 is viewed from a front and obliquely upper direction. FIG. 12 is a left side view of the camera apparatus 20. FIG. 13 is a right side view of the camera apparatus 20. FIG. 14 is a top view of the camera apparatus 20. FIG. 15 is a front view of the camera apparatus 20.

The lens 180 is a lens for a single plate type imaging section. That is, in the camera apparatus 20, unlike the camera apparatus 10 described above, a lens for a single plate type imaging section is used. The lens 180 is directly connected to the lens mount section of the front portion of the camera main body 110. That is, the mount adapter 150 and the like in the camera apparatus 10 described above are not present between the camera main body 110 and the lens 180.

In the camera apparatus 20, compared to the camera apparatus 10 described above, the center of gravity moves backward, and therefore, the position of the handle 120 is also moved and adjusted to the rear. Further, the shoulder adapter 140 is also moved and adjusted to the rear according to the position of the viewfinder 130 mounted on the handle 120.

In the camera apparatus 10 described above, the camera main body 110 has a single plate type imaging section. However, the lens 160 for a three-plate type imaging section can be used to be mounted on the lens mount section 111 of the front portion of the camera main body 110 through the mount adapter 150. Further, the handle 120 is mounted on the camera main body 110 so as to be able to move in the front-back direction (the optical axis direction), and examining a case of mounting the lens 160 for a three-plate type imaging section, the position of the handle 120 can be moved in accordance with a change in the center of gravity. Therefore, it becomes possible to attain improvement in the usage environment of the lens 160 for a three-plate type imaging section in the camera main body 110 having, for example, a single plate type imaging section.

Further, in the camera apparatus 10 described above, the shoulder adapter 140 is mounted on the lower portion of the camera main body 110 so as to be able to move in the front-back direction (the optical axis direction). For this reason, examining a case of mounting, for example, the lens 160 for a three-plate type imaging section, in a case where the position of the handle 120, therefore, the position of the viewfinder 130 is moved in accordance with a change in the center of gravity, it becomes possible to adjust the position of the shoulder adapter 140 to the optimal position for a user.

Further, in the camera apparatus 10 described above, the mount adapter 150 is supported by using the rod-like members 127 provided at the shoulder adapter 140 so as to protrude in the front direction. For this reason, for example, in a structure in which the lens 160 for a three-plate type imaging section is mounted on the camera main body 110 via the mount adapter 150, the relatively heavy lens 160 is supported by not only the mount adapter 150, but also the support section 154f, whereby it becomes possible to prevent the fatigue, breakage, or the like of the mount adapter 150 before it happens.

Further, in the camera apparatus 10 described above, the mount adapter 150 has the lens unit 153 which leads a light beam that is incident from the lens 160 for a three-plate type imaging section to the single plate type imaging section of the camera main body. Then, the lens unit 153 has functions to adjust a focal length so as to be focused on the image sensor of the single plate type imaging section, to adjust the size of an image which is formed on the image sensor, and the like. Accordingly, for example, in the camera main body 110 having a single plate type imaging section, the lens 160 for a three-plate type imaging section can be used favorably.

Further, in the camera apparatus 10 described above, the mount adapter 150 has the filter disk unit 154. For this reason, it is possible to favorably perform light quantity adjustment in the mount adapter 150. Further, in this case, the filter disk unit 154 is provided with the turret rotation mechanism 154b which is driven by the servomotor 154a, and a user can easily replace the filter 154d by simply pressing the push button 154e. That is, a user can appropriately perform light quantity adjustment with a simple operation.

2. Modified Example

In addition, in the embodiment described above, a configuration is illustrated in which the mount adapter 150 has the filter disk unit 154 in addition to the lens unit 153. However, due to a configuration in which light quantity adjustment can be sufficiently performed on the camera main body 110 side, it is not necessary to provide the filter disk unit 154 in the mount adapter 150. Further, in the embodiment described above, a configuration is adopted in which the filter disk unit 154 has the turret rotation mechanism. However, of course, the present disclosure is not limited thereto.

Further, the present disclosure can takes the following configurations.

(1) A camera apparatus including: a camera main body having a single plate type imaging section; and a handle mounting section for mounting a handle on an upper portion of the camera main body, wherein a lens for a three-plate type imaging section can be mounted on a lens mount section of a front portion of the camera main body via a mount adapter, and the handle mounting section mounts the handle on the upper portion of the camera main body so as to be able to move in a front-back direction.

(2) The camera apparatus according to the above (1), wherein the handle mounting section has a lock mechanism which fixes a position in the front-back direction of the handle to an arbitrary position.

(3) The camera apparatus according to the above (1) or (2), wherein the handle has a viewfinder mounting section for mounting a viewfinder.

(4) The camera apparatus according to any one of the above (1) to (3), further including: a shoulder adapter mounting section for mounting a shoulder adapter on a lower portion of the camera main body, wherein the shoulder adapter mounting section mounts the shoulder adapter on the lower portion of the camera main body so as to be able to move in the front-back direction.

(5) The camera apparatus according to the above (4), further including: a support mechanism which supports the mount adapter by using a rod-like portion provided on the shoulder adapter so as to protrude in a front direction.

(6) The camera apparatus according to any one of the above (1) to (5), wherein the mount adapter has a lens unit which leads a light beam that is incident from the lens for a three-plate type imaging section to the single plate type imaging section of the camera main body, and a filter disk unit having a predetermined type of filter for adjusting a light quantity of the light beam.

(7) A mount adapter including: a first mount section which is connected to a lens mount section of a front portion of a camera main body having a single plate type imaging section; a second mount section for connecting a lens for a three-plate type imaging section; and a lens unit which emits a light beam that is incident on the second mount section, from the first mount section.

(8) The mount adapter according to the above (7), further including: a filter disk unit having a predetermined type of filter for adjusting a light quantity of a light beam incident on the second mount section.

(9) The mount adapter according to the above (7) or (8), wherein the first mount section is an FZ mount and the second mount section is a B4 mount.

(10) A camera apparatus including: a camera main body having a single plate type imaging section; a lens for a three-plate type imaging section; and a mount adapter which is interposed between the camera main body and the lens.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus comprising:
   a camera main body having a single plate type imaging section; and
   a handle mounting section configured to mount a handle on an upper portion of the camera main body,
   wherein a lens for a three-plate type imaging section can be mounted on a lens mount section of a front portion of the camera main body via a mount adapter, and
   the handle mounting section is configured to mount the handle on the upper portion of the camera main body such that the handle is movable along a front-back direction.

2. The camera apparatus according to claim 1, wherein the handle mounting section has a lock mechanism which fixes a position in the front-back direction of the handle to an arbitrary position between a first end of the handle mounting section and a second end of the handle mounting section.

3. The camera apparatus according to claim 1, wherein the handle has a viewfinder mounting section for mounting a viewfinder.

4. The camera apparatus according to claim 1, further comprising:
   a shoulder adapter mounting section configured to mount a shoulder adapter on a lower portion of the camera main body,
   wherein the shoulder adapter mounting section is configured to mount the shoulder adapter on the lower portion of the camera main body such that the handle is movable along the front-back direction.

5. The camera apparatus according to claim 4, further comprising:
   a support mechanism configured to support the mount adapter by using a rod-like portion provided on the shoulder adapter so as to protrude in a front direction.

6. The camera apparatus according to claim 1, wherein the mount adapter has
   a lens unit which leads a light beam that is incident from the lens for a three-plate type imaging section to the single plate type imaging section of the camera main body, and
   a filter disk unit having a predetermined type of filter for adjusting a light quantity of the light beam.

7. The camera apparatus according to claim 1, wherein the mount adapter comprises:
   a first mount section which is connected to the lens mount section;
   a second mount section for connecting the lens; and
   a lens unit disposed between the first mount section and the second mount section which emits a light beam that is incident on the second mount section, from the first mount section.

8. The camera apparatus according to claim 1, wherein
   the handle mounting section further comprises a rod-like member extending in the front-back direction, and
   the handle is configured to move along the rod-like member.

* * * * *